March 30, 1954

D. A. E. BEER

2,673,531

APPARATUS FOR THE PRODUCTION OF ICE-CREAM SANDWICH WAFERS

Filed March 19, 1951

INVENTOR
DONALD A. E. BEER
By [signature] Atty

Patented Mar. 30, 1954

2,673,531

UNITED STATES PATENT OFFICE 2,673,531

APPARATUS FOR THE PRODUCTION OF ICE-CREAM SANDWICH WAFERS

Donald Albert E. Beer, Southbourne, Bournemouth, England

Application March 19, 1951, Serial No. 216,321

Claims priority, application Great Britain March 21, 1950

4 Claims. (Cl. 107—1)

This invention relates to apparatus for the production of ice-cream sandwich wafers, that is to say wafers having a layer of ice cream sandwiched between a pair of biscuits. The term "ice-cream" used herein is to be understood as including any other solid edible substance of a similar consistency to ice-cream suitable as a confection, and which therefore is capable of being cut by a knife.

The invention has for its main object to produce an ice-cream sandwich wafer mechanically, so that apart from recharging an apparatus with biscuits and ice-cream an operator only has to drive such apparatus or control a power drive therefor.

In one aspect, the invention consists in a method of mechanically producing ice-cream wafers by the use of mutually-synchronised biscuit-dispensing and ice-cream severing and depositing apparatus, said mechanical method of production consisting in depositing a biscuit on to a platform by the biscuit-dispensing apparatus, passing a travelling knife of the severing apparatus through an end portion of an ice-cream block to sever said end portion therefrom, and, by means of the depositing apparatus, transporting said portion towards and over the biscuit and depositing said portion on said biscuit, and then by the biscuit-dispensing apparatus depositing a biscuit upon said ice-cream portion, the ice-cream block being caused or allowed to advance step-by-step for the cutting therefrom of successive portions used for successive ice-cream wafers.

The ice-cream block may be upwardly fed mechanically for the step-by-step advance, the knife travelling in a horizontal plane to sever an upper portion therefrom. The cut-off portion of ice-cream may be transported by the knife and become arrested by a stop while the knife continues its travel.

The method may comprise mechanically ejecting the completed ice-cream wafer from the platform.

In respect of the biscuit deposition the method may include reciprocating a twin-apertured delivery plate coacting with a pair of biscuit stacks and thereby taking biscuits from said stacks alternately, and depositing said biscuits through a single opening in a fixed plate.

In another aspect the invention consists in the provision of apparatus for the mechanical production of ice-cream wafers, said apparatus comprising a biscuit-dispensing means synchronised with ice-cream severing and depositing means, a driving means therefor, and a holder for an ice-cream block, said means operating so that in sequence a biscuit is deposited on a platform, an end portion is cut off from a vertically-disposed elongated ice-cream block projected from the holder and so deposited on said biscuit and a biscuit is deposited on said ice-cream portion, the ice-cream severing and depositing means including a travelling member for transporting the cut-off portion of ice-cream in a lateral direction from the ice-cream block to a position over the first-deposited biscuit, and provision for causing or allowing the ice-cream block to advance step-by-step from the holder for the cutting therefrom of successive portions used for successive ice-cream wafers.

A knife provided for cutting through the ice-cream block may serve as the transporting means for the cut-off ice-cream portion, and the apparatus may include means for dislodging said ice-cream portion from said knife. This dislodging means may comprise a stop for arresting the transported ice-cream portion while the knife continues its travel.

The apparatus may include a cold chamber into which downwardly depends the holder for the ice-cream block. By "cold chamber" is meant a chamber maintained at a temperature below 0° centigrade. In this case means will be provided for feeding said ice-cream block upwardly from said cold chamber. The biscuit-dispensing means will be suitably supported above said cold chamber.

The apparatus may include delivery means for imparting lateral travel to the completed ice-cream wafer to eject it from the platform, said delivery means being synchronised with the other driven devices.

Provision may be made for varying the extent of advance or feed of the ice-cream block and therefore the thickness of the cut-off portion. The feed device for said ice-cream block may include a toothed rack engageable by a tooth or teeth provided on a peripheral portion of a rotary member, said rack also engaging a pawl which serves to retain said feed device in its fed position. If it is required to provide for varying the thickness of the ice-cream portion then two or more toothed elements may be provided on said rotary member, these elements being side-by-side and being selectively engageable with the rack.

The biscuit-dispensing means may comprise a vertical open-bottom container or pair of such containers for a stack or stacks of biscuits, an operating plate which is horizontally slidable beneath said biscuit-stack container or containers, said operating plate having an opening adapted to register with the container, or a pair of containers for registering with the different holders as the case may be, said one or each opening being adapted to receive a biscuit from the associated container, a fixed bottom plate beneath said operating plate, said bottom plate having a delivery opening above the wafer-production platform, the biscuit container or containers being offset with respect to the said delivery opening and the travel of the operating plate being such as to transport the received biscuit from the one or each biscuit container to the delivery opening.

The holder for the ice-cream block and other similar holders may depend from a carrier at spaced-apart positions, said carrier being movable to enable any selected one of said holders to be brought to the operative position, means being provided to enable a holder which is not at the operative position to be recharged.

An apparatus of convenient form in accordance with the invention will now be described by way of example and is shown in the accompanying drawings, wherein.

Figure 1:
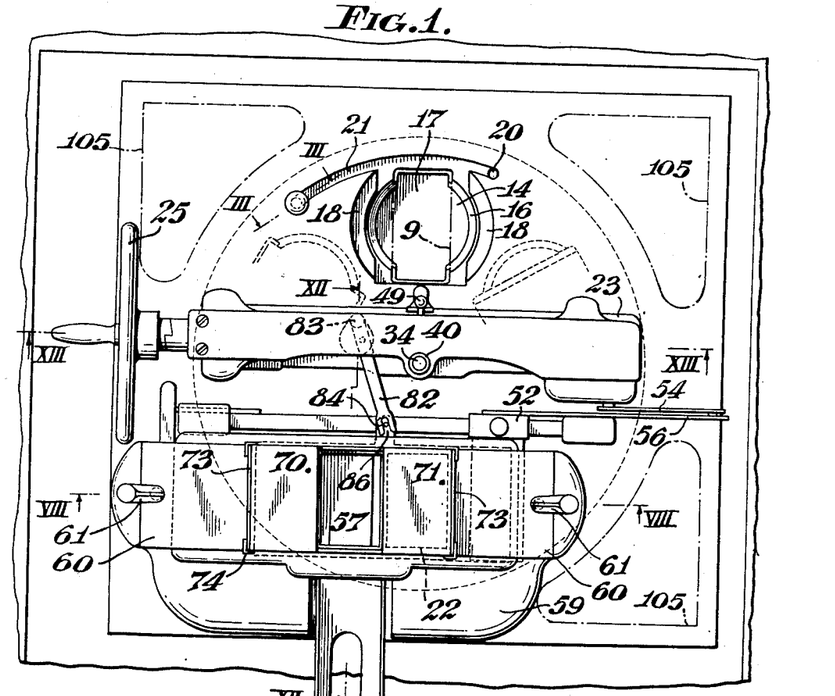
Figure 1 is a plan view of the apparatus.
Figures 4, 5, 6:
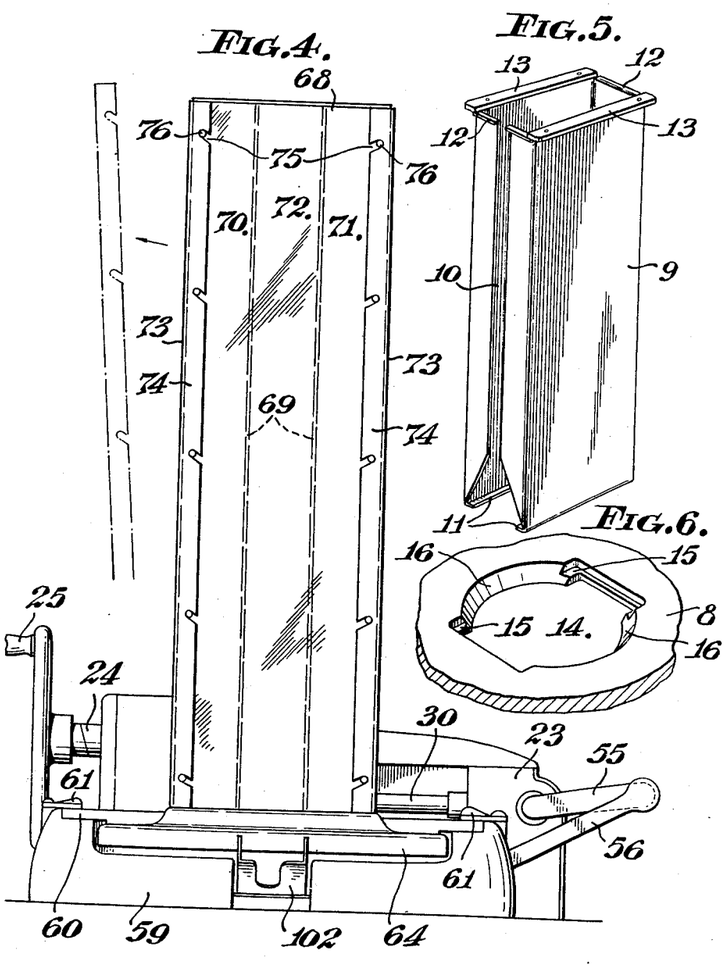
Figure 4 is a front elevation of the apparatus.
Figure 5 is a perspective view of one of the ice-cream-block holders for suspension from the rotatable carrier plate shown in Figure 2.
Figure 6 is a fragmentary perspective view of one of the openings in the carrier plate shown in Figure 2, and showing recessed formations serving to receive and support a top rim of the holder shown in Figure 5.
Figure 8:
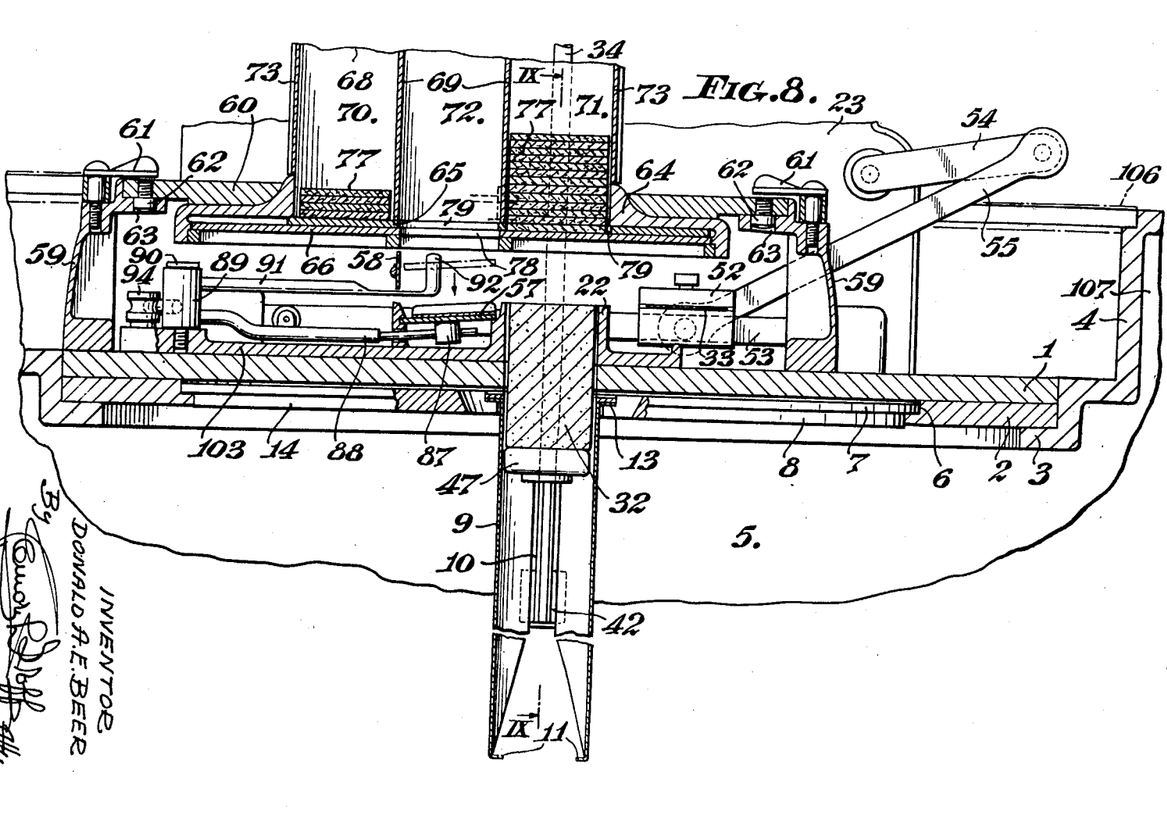
Figure 8 is a cross section on line VIII—VIII in Figure 1.

Referring to Figures 1 and 8, a base plate 1 serves to support the mechanically-operated parts of the apparatus and the driving gear therefor, this plate 1 seating upon a lower frame 2 which itself seats upon a flange 3 at the bottom of a depending well portion 4 of a cold chamber 5, only the upper portion of which is shown (Figure 8). The lower frame 2 has a circular stepped inner periphery 6 whereby it supports a peripheral flange 7 of a carrier plate 8, said carrier plate being thereby suspended in a manner permitting it to be given rotational movements by hand operation. This carrier plate 8 serves for the suspension of holders 9 (Figure 5), for receiving blocks of ice-cream, one block in each holder. Each of said holders 9 is an elongated casing of rectangular shape in cross section having a vertical slot 10 in one wall for the purpose hereinafter described, and having inturned flanges 11 at the bottom for supporting an ice-cream block inserted into the holder by way of the top thereof. The said holder 9 also has external top flanges 12, 13. For the reception of said holders 9 the carrier plate is formed with a series of circumferentially-spaced openings 14. On opposite sides of each opening 14 the plate 8 is formed with recesses 15 for receiving the flanges 12 of the holder 9, thereby to support said holder. The arcuate wall portions 16 of the opening 14 leave a clearance between themselves and the adjacent walls of the holder 9 and they may be bevelled off as shown; this clearance enables an operator to insert his fingers beneath the flanges 13 of the holder so as to facilitate raising said holder and removing same in this manner from plate 8. To allow for this removal of an empty holder and the replacement of same by a charged holder an opening 17 is formed in the base plate 1. This opening also has bevelled arcuate wall portions 18 which afford spaces of sufficient size to allow for finger insertion as above. Thus, the holders can be lifted out through, and be inserted through, the base plate 1.

Figures 2, 3:
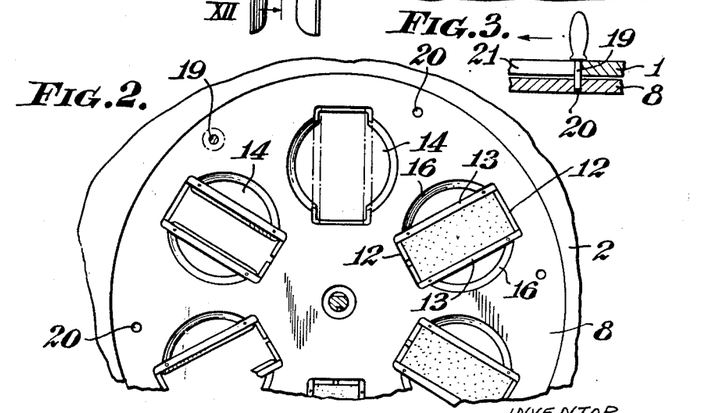
Figure 2 is a fragmentary plan view of a rotatable carrier plate for suspending holders which serve to contain blocks of ice-cream, this plate being the part shown by a broken-line circle in Figure 1.
Figure 3 is a section on line III—III in Figure 1.

To enable the carrier plate 8 to be turned to bring each holder 9 in turn to an operative position where the ice-cream block carried by said holder can be dealt with for the production of an ice-cream wafer as later herein described, there is provided a loose pin 19 engageable into any one hole of a series of holes 20 formed in the plate 9, this pin being able to traverse an arcuate slot 21 in the base plate 1. When the pin reaches the end of said slot 21 the carrier plate 8 is in a position where a charged holder 9 is in register with a throat 22 to enable the ice-cream block of said holder to be fed upwardly through said throat, an empty holder 9 being brought by the said movement of the carrier plate 8 to a position in register with the base plate opening 17 for removal of said holder and the substitution therefor of a charged holder.

Figures 12, 13:
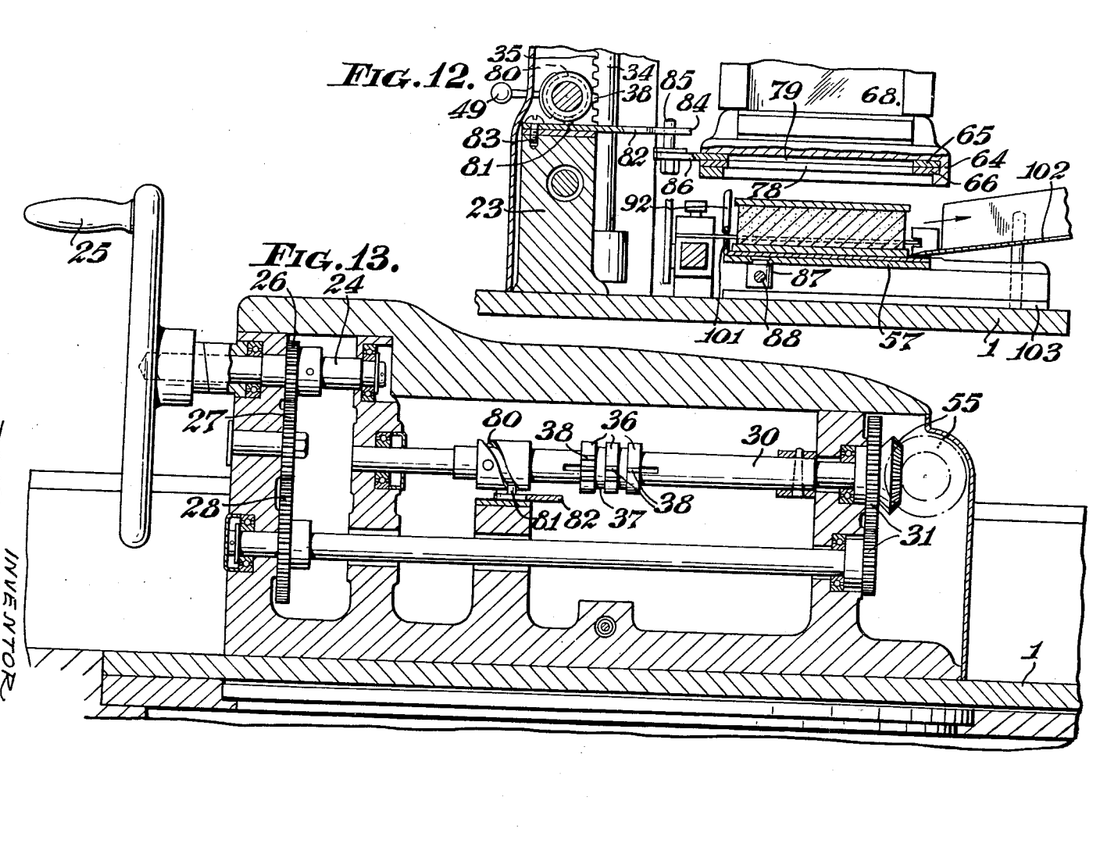
Figure 12 is a vertical section on line XII—XII in Figure 1.
Figure 13 is a vertical section on line XIII—XIII in Figure 1.

The various driven parts that are carried by the base plate 1 and removable as a unit therewith, are operated by a drive device mounted in a casting 23 secured upon said plate 1. As shown in Figure 13 this drive device comprises a shaft 24 having fixed thereon a handle 25 and a pinion 26 which drives, via an idler spur wheel 27 and gear wheel 28, a secondary shaft 29, this secondary shaft driving a main shaft 30 via gearing 31. The said trains of gears are such as to give a reduced velocity ratio.

For the production of successive ice-cream wafers it is required to impart upward step-by-step movements to an ice-cream block 32 contained in the holder 9 which for the time being is at the operative position, in order that a portion of said block projected above the throat 22 may be cut off by a horizontally travelling knife 33 (Figure 8). For this upward feed of block 32 there is provided a feed rod 34 having a toothed rack 35 (Figure 9) engageable by any one of a series of toothed elements 36 on a sleeve 37 (Figure 13) keyed on the main shaft 30 so as to turn therewith. Different numbers of teeth 38 are provided on these toothed elements 36 for engaging with rack 35, and consequently the feed rod 34 will be raised to different extents by different elements 36 for a single rotation of main shaft 30. A spring loaded pawl 39 (Figure 9) serves to hold the feed rod 34 in the position to which it has been raised, this pawl being releasable to allow said rod to be lowered. The feed rod 34 travels in guideways 40 of the casting 23 and has a keyway 41 engaged by a key in each of these guideways to prevent the turning of the rod.

On the bottom of feed rod 34 there is detachably fitted a foot piece 42. This foot piece 42 is formed with a hole entered by rod 34 and closed at the bottom by plate 43, said hole having therein a key engaging into the rod keyway 41, said foot piece pivotally carrying a horizontal catch 44 (Figure 11) which is urged by a spring 45 to maintain a position in which said catch is engaged in a notch 46 formed in rod 34. The foot piece 42 extends laterally from the rod 34 as shown and is able to travel up the vertical slot 10 (Figure 5) of the ice-cream holder, the portion of the said foot piece which enters said holder being upwardly cranked and provided with a head 47 which serves to support and lift the ice-cream block 32. The extent to which the feed rod 34 can be lowered is such as to bring the foot piece 42 clear of the bottom of the ice-cream holder 9 to allow the carrier plate 8 to be turned as hereinbefore described to bring a fresh holder 9 to the operative position. When the feed rod 34 receives its first upward movement, the head 47 of the foot piece passes up between the holder flanges 11 (Figure 5) and thus raises the ice-cream block which so far has been resting on those flanges.

Figures 9, 10, 11:
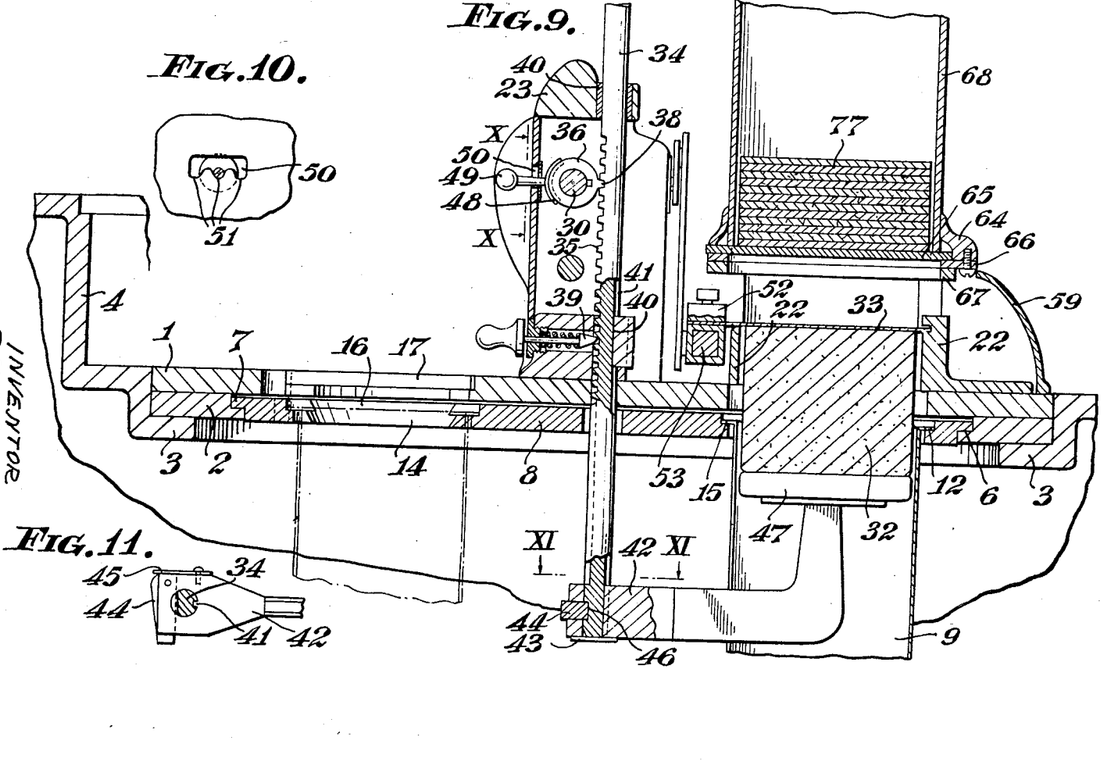
Figure 9 is a vertical section on line IX—IX in Figure 8.
Figure 10 is a section on line X—X in Figure 9.
Figure 11 is a section on line XI—XI in Figure 9.

To provide for shifting the sleeve 37 carrying the toothed elements 36 there is a small striking fork 48 engaged with one or each of the grooves between said toothed elements, this striking fork having a handle portion 49 projecting through a slot 50 in a cover plate of casting 23, said slot 50 having its lower edge shaped to provide notches 51 for retaining said striking fork in the selected position (Figure 10).

The knife 33 for cutting off the portion of the ice-cream block 32 projected above the throat 22 after each occasion of lift, is carried by a square-section sleeve 52 slidable along a square-section horizontal bar 53 suitably supported from the base plate 1. The knife 33 is readily detachable from sleeve 52, and its plane of travel is such that it passes just clear of the top of throat 22. However, the front wall of throat 22 may be upwardly extended and grooved to serve as a guide for the knife as shown in Figure 9. The knife-carrying sleeve 52 is reciprocated along the bar 53 by a throw device comprising a crank 54 driven through bevel gearing 55 (Figure 13) from the main shaft 30, said crank 54 being coupled via a link 56 to the sleeve 52. The extent of travel thus imparted to the sleeve 52 is such that the knife commences its forward stroke (right to left in Figure 8) well clear of the throat 22 and then passes across said throat and across wafer-production platform 57 side-by-side with said throat and then passes clear of said platform 57 and entirely beyond a stop 58 which is provided for a purpose hereinafter set forth.

A biscuit-dispensing unit for gravitationally depositing wafer biscuits above the platform 57 is supported above the base plate 1 on a stand 59 secured on said base plate; it is readily removable as a self-contained unit and accordingly (see Figure 8), has a foundation plate 60 fitting into a recess in the stand 59, turnbutton fasteners 61 being provided for holding said plate 60 in said stand 59. Location of the foundation plate 60 against lateral displacement is assured by the provision of dowel pins 62 on said plate, these pins passing into holes 63 in stand 59. The foundation plate 60 has fixed to it a housing 64 which houses a slidable operating plate 65 lying upon a fixed bottom plate 66, said plates 65 and 66 being supported upon a retaining frame 67 secured in the open bottom of the housing 64. An opening in the top of the housing 64 receives the lower portion of a casing 68 which is closed at the top and open at the bottom, this casing being suitably secured in said housing 64. Partitions 69 divide the casing 68 into biscuit-receiving compartments 70, 71 and a centre space 72 which is not used. Access is obtained to the compartments 70, 71 for filling them with stacked biscuits by detaching removable side plates 73 that form the sides of the casing. For keeping these plates 73 in closed position, side cheeks 74 thereon are formed with inclined notches 75 that engage with fixed pins 76 on the casing. Reference 77 denotes wafer biscuits contained in the compartments 70, 71.

The bottom plate 66 has a biscuit-delivery opening 78 centrally of its length, this opening being directly above the wafer-production platform 57. The operating plate 65 has two openings 79 formed through it, these openings being so disposed that when said plate is at the extreme right hand position as shown in Figure 8, one opening 79 is in register with compartment 71 and receives the lowermost biscuit therefrom as shown, the other opening 79 being in register with the delivery opening 78. When the operating plate is at the extreme left-hand position, one opening 79 registers with compartment 70, the other opening 79, registering with the delivery opening 78.

For reciprocating the operating plate 65, so as to take biscuits from the compartments 70 and 71 alternately, the main shaft 30 is provided with a collar having a cam groove 80 engaging a pin 81 on an arm 82 which is free to oscillate about a pin 83 on the casting 23. The arm 82 has a forked outer end 84 engageable with a pin 85 provided on an ear portion 86 of plate 65. It will be seen from Figure 12 that the housing 64 is devoid of a depending rear wall; this enables the plates 65 and 66 to be inserted from the back of said housing.

The above described drives for the various moving parts are synchronised so that the machine operates in the following manner:

During the return stroke of knife 33 (left to right in Figure 8) and after said knife has passed clear of the platform 57 and throat 22, or during an initial portion of the forward travel of said knife, the operating plate 65 of the biscuit-dispenser unit is moved to deposit a biscuit via opening 78 on to the platform 57. Also the feed rod 34 is lifted by the selected one of the toothed elements 36 and thereby raises the ice-cream block 32 which is at the operative position. An upper portion of said block 32 is thereby caused to project to a predetermined extent above the throat 22. The knife 33 during its forward travel cuts through the said projected upper portion of the ice-cream block, the cut-off portion remaining on the knife and being transported by same, but soon encountering the stop 58. The knife continues its travel and consequently the arrested ice-cream portion becomes dislodged from said knife and drops on to the biscuit already resting on platform 57. The operating plate 65 of the biscuit dispenser is moved in the reverse direction to that of its previous movement and now deposits a further biscuit, this biscuit dropping on to the ice-cream portion already deposited on the first biscuit. Thus, an ice-cream wafer is formed.

Figure 7:
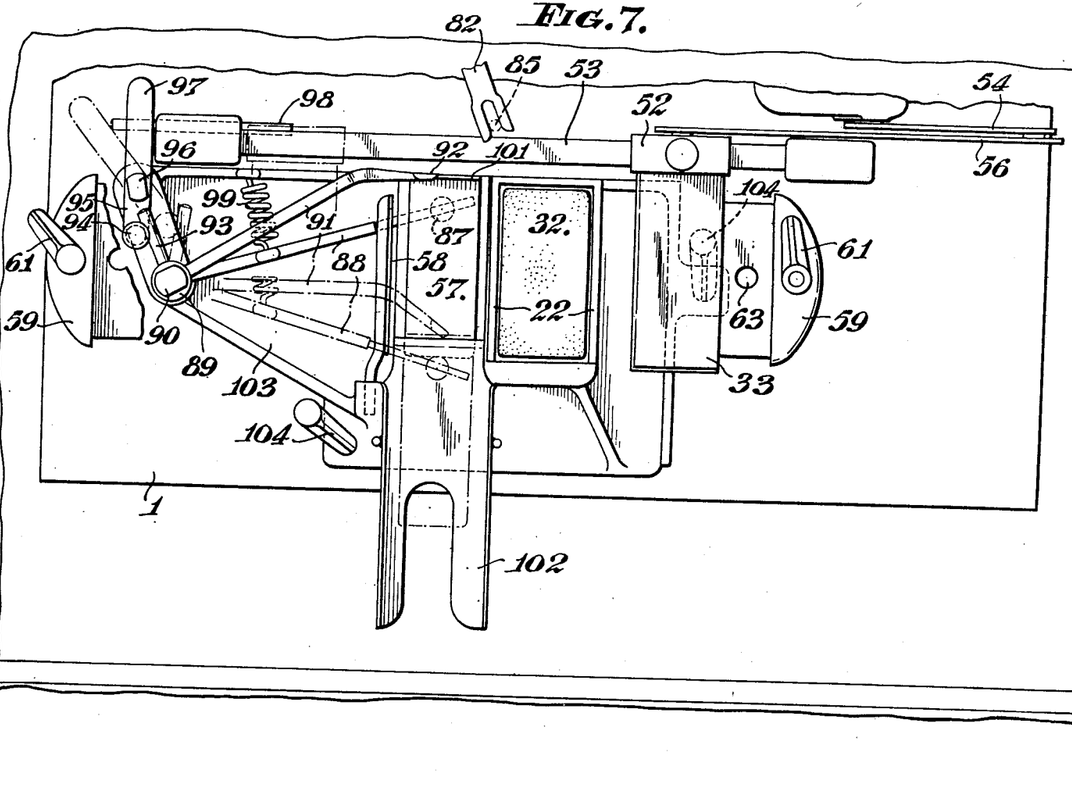
Figure 7 is a fragmentary plan view of the front portion of the apparatus with the biscuit-dispensing unit removed, one of the supports for the biscuit-dispensing unit being shown partly broken away.

For the ejection of the completed ice-cream wafer the platform 57 is slidably mounted for movement towards the front of the machine and it pivotally carries a downwardly extending stud 87 having a diametral bore through which slidably passes an angularly displaceable ejector arm 88 (Figure 7). This arm 88 extends radially from a sleeve 89 which can turn on a stud 90. This sleeve 89 has another radial arm 91 with an upstanding finger portion 92 serving as a pusher behind the ice-cream wafer, the arms 88 and 91 moving as a unit. The sleeve 89 has another radial arm 93 against which can bear a stud 94 provided on one arm 95 of a two-armed lever pivotal about a pin 96. Against the other arm 97 of this lever is adapted to bear a slidable rod 98 mounted in one of the supports for the bar 53. At the appropriate moment, that is to say as the knife nears the end of its forward travel, the knife-carrying sleeve 52 strikes the rod 98 and slidably displaces same, thus turning the lever 95, 97 anti-clockwise and therefore the sleeve 89 clockwise to bring the arms 88 and 91 to the positions shown in dotted lines in Figure 7. A spring 99 serves to restore the parts 88, 57, 91, 95 and 98 to normal position.

The platform 57 is shown provided with a surface plate 100 (Figure 12) having an upstanding rear cheek 101 which, in conjunction with the finger portion 92 of arm 91 ensures delivery displacement of the ice-cream wafer. Such delivery displacement pushes the said ice-cream wafer on to a receiving plate 102 from which it can be taken by a purchaser.

It will be observed that a plate-like unit 103 which seats upon the base plate 1 and can be located in any suitable manner, and which is held in place by turn-button elements 104, incorporates as self-contained parts thereof the throat 22, the platform 57, the parts 88 to 93 and spring 99 of the ejector mechanism, and the receiving plate 102, enabling these parts when removed as a unit to be cleaned and sterilised easily and conveniently, and giving access to the knife 33, which knife can be itself readily removed from the sleeve 52 for cleaning, sharpening and sterilising operations.

As shown in dotted lines in Figure 1, large openings 105 may be formed through plate 1, a cover plate 106 (Figures 8 and 9), which seats at its rim on the wall of the cold chamber, serving to form the roof proper of the cold chamber. In this way the working parts of the apparatus, and those parts which the ice-cream contacts, are maintained at sub-zero centigrade temperature so as to satisfy bacteriological requirements. The cover plate 106 will have openings through which the upstanding portions of the apparatus pass and it may have a depression to accommodate the handle 25 and permit free turning thereof. Likewise, it may have a raised portion to accommodate the movement of the crank 54.

The cover plate 106 also will have a depending neck leading to the base-plate opening 17 and a well above the receiving plate 102 so that a purchaser can lift the completed wafer out of said well. Or mechanical means may be provided for lifting the completed and ejected wafer to the surface of cover plate 106.

As will be seen, a jacket portion 107 of the cold chamber surrounds the zone containing the working parts of the apparatus and this contributes to the desired low temperature of that zone.

I claim:

1. In an ice-cream sandwich making machine, a cold chamber, a holder for an ice-cream block, said holder depending into said cold chamber and having an open upper end, means for feeding said ice-cream block upwardly step-by-step and thereby projecting a portion of said block above the open upper end of said holder, a knife, knife-operating means for imparting horizontal travel to said knife to cause same to cut off and transport said projecting portion of said ice-cream block, said knife-operating means being synchronised with said block-feeding means, a platform for supporting thereon a completed ice-cream sandwich, means for arresting an ice-cream portion being transported on said knife and holding said ice-cream portion in a position above said platform while said knife moves clear of said arrested ice-cream portion, a biscuit supply means effecting downward feed of biscuits and an assembling mechanism for placing in superimposed relationship on said platform two biscuits delivered from said biscuit supply means and said arrested ice-cream portion, said assembling mechanism being situated at the top of said cold chamber.

2. In an ice-cream sandwich making machine, a cold chamber, a holder for an ice-cream block, said holder depending into said cold chamber and having an open upper end, means for feeding said ice-cream block upwardly step-by-step and thereby projecting a portion of said block above the open upper end of said holder, a knife-holder, knife-operating means for imparting horizontal travel to said knife-holder to cause said knife to cut off and transport said projecting portion of said ice-cream block, said knife-operating means being synchronised with said block-feeding means, a platform for supporting thereon a completed ice-cream sandwich, means for arresting an ice-cream portion being transported on said knife and holding said ice-cream portion in a position above said platform while said knife moves clear of said arrested ice-cream portion, a biscuit supply means effecting downward feed of biscuits, an assembling mechanism for placing in superimposed relationship on said platform two biscuits delivered from said biscuit supply means and said arrested ice-cream portion, said assembling mechanism being situated at the top of said cold chamber, and an ejector for said completed ice-cream sandwich, said ejector being in contacting relationship with said knife holder for operation thereby when said knife has moved clear of said arrested ice cream portion.

3. In an ice-cream sandwich making machine, a cold chamber, a holder for an ice-cream block, said holder depending into said cold chamber and having an open upper end, means for feeding said ice-cream block upwardly step-by-step and thereby projecting a portion of said block above the open upper end of said holder, said block-feeding means comprising a toothed rack in parallel relationship to said holder, a supporting foot carried by said rack, said foot providing support for said ice-cream block, a rotatable driving shaft, a rack-operating member secured on said driving shaft, at least one tooth on said rack-operating member, said tooth engaging said rack, and a releasable pawl engaging said rack, a knife, knife-operating means for imparting horizontal travel to said knife to cause same to cut off said projecting portion of said ice-cream block, said knife-operating means comprising a helical cam secured on said driving shaft, a knife-holder carrying said knife, and a projection on said knife-holder, said projection engaging said helical cam, said helical cam being shaped to produce forward and return movements of said knife-holder by uni-directional turning of said driving shaft, a biscuit supply means effecting downward feed of biscuits, and an assembling mechanism for placing in superimposed relationship two biscuits delivered from said biscuit supply means and said cut-off portion of said ice-cream block, said assembling mechanism being situated at the top of said cold chamber.

4. In an ice-cream sandwich making machine, a cold chamber, a holder for an ice-cream block, said holder depending into said cold chamber and having an open upper end, means for feeding said ice-cream block upwardly step-by-step and thereby projecting a portion of said block above the open upper end of said holder, said block-feeding means comprising a toothed rack in parallel relationship to said holder, a supporting foot carried by said rack, said foot providing support for said ice-cream block, a rotatable rack-operating member, a plurality of sets of teeth on said rack-operating member, said sets of teeth being in side-by-side relationship, the number of teeth comprising each of said sets being different in different sets, means for imparting axial movement to said rack-operating member to bring said sets of teeth selectively into engagement with said rack of said block-feeding means, and a releasable pawl for engaging said rack, a knife, knife-operating means for imparting horizontal travel to said knife to cause same to cut off said projecting portion of said ice-cream block, said knife-operating means being synchronised with said block-feeding means, a biscuit supply means effecting downward feed of biscuits, and an assembling mechanism for placing in superimposed relationship two biscuits delivered from said biscuit supply means and said cut-off portion of said ice-cream block, said assembling mechanism being situated at the top of said cold chamber.

DONALD A. E. BEER.

References Cited in the file of this patent

UNITED STATES PATENTS

| Number | Name | Date |
| --- | --- | --- |
| 1,108,454 | Maisch | Aug. 25, 1914 |
| 1,211,375 | Clayton | Jan. 2, 1917 |
| 1,248,249 | Bjorkman | Nov. 27, 1917 |
| 1,309,643 | Leich et al. | July 15, 1919 |
| 1,395,654 | Porz | Nov. 1, 1921 |
| 1,482,138 | Moomjian | Jan. 29, 1924 |
| 1,497,863 | Lux et al. | June 17, 1924 |
| 2,122,523 | Hulskamp | July 5, 1938 |
| 2,148,451 | Elliott | Feb. 28, 1939 |

FOREIGN PATENTS

| Number | Country | Date |
| --- | --- | --- |
| 291,811 | Germany | May 10, 1916 |